(12) United States Patent
Kim (10) Patent No.: US 9,059,469 B2
(45) Date of Patent: Jun. 16, 2015

(54) ELECTRODE ASSEMBLY HAVING FIBER-SHAPED STRUCTURES, AND BATTERY INCLUDING SAME

(75) Inventor: Kwon Seok Kim, Seoul (KR)

(73) Assignee: SHINE CO., LTD., Busan (KR)

( * ) Notice: Subject to any disclaimer, the term of this patent is extended or adjusted under 35 U.S.C. 154(b) by 0 days.

(21) Appl. No.: 13/817,043

(22) PCT Filed: Aug. 13, 2011

(86) PCT No.: PCT/KR2011/005984
§ 371 (c)(1),
(2), (4) Date: Feb. 14, 2013

(87) PCT Pub. No.: WO2012/023774
PCT Pub. Date: Feb. 23, 2012

(65) Prior Publication Data
US 2013/0149580 A1  Jun. 13, 2013

(30) Foreign Application Priority Data

Aug. 14, 2010  (KR) .................. 10-2010-0078550

(51) Int. Cl.
*H01M 4/00* (2006.01)
*H01M 4/78* (2006.01)
*H01M 6/10* (2006.01)
*H01M 4/66* (2006.01)
*H01M 6/02* (2006.01)
*H01M 10/04* (2006.01)
*H01M 2/04* (2006.01)
*H01M 10/28* (2006.01)

(52) U.S. Cl.
CPC ............ *H01M 4/78* (2013.01); *H01M 10/0409* (2013.01); *H01M 2/0417* (2013.01); *H01M 6/10* (2013.01); *H01M 10/283* (2013.01); *H01M 4/661* (2013.01); *H01M 6/02* (2013.01)

(58) Field of Classification Search
CPC ......... H01M 4/661; H01M 4/78; H01M 6/02; H01M 6/10; H01M 10/283; H01M 2/0417; H01M 2004/022; H01M 10/0409; Y02E 60/12
USPC ............ 429/94, 140, 144, 164, 165, 167, 209
See application file for complete search history.

(56) References Cited

FOREIGN PATENT DOCUMENTS

| JP | 04-169066 | 6/1992 |
|---|---|---|
| JP | 2004-207231 | 7/2004 |
| KR | 10-2005-0099903 | 10/2005 |
| KR | 10-2007-0009231 | 1/2007 |

(Continued)

OTHER PUBLICATIONS

International Search Report mailed Mar. 9, 2012 for PCT/KR2011/005984.

(Continued)

*Primary Examiner* — Patrick Ryan
*Assistant Examiner* — Ben Lewis (57) ABSTRACT

The present invention relates to an electrode assembly having fiber-shaped structures, and a battery including the same. According to one embodiment of the present invention, the electrode assembly comprises: a first electrode having one or two or more first fiber-shaped structures that have either a positive or negative pole; and a second electrode having one or two or more second fiber-shaped structures that have a different polarity from the structures and enclose said first structures in a spiral manner.

10 Claims, 4 Drawing Sheets

(56) References Cited

FOREIGN PATENT DOCUMENTS

| KR | 1020070009231 A | * | 1/2007 | ............ H01M 4/02 |
| KR | 10-2007-0075928 | | 7/2007 | |

OTHER PUBLICATIONS

Written Opinion of the International Search Report mailed Mar. 9, 2012 for PCT/KR2011/005984.

* cited by examiner

ELECTRODE ASSEMBLY HAVING FIBER-SHAPED STRUCTURES, AND BATTERY INCLUDING SAME

This application claims the priority of Korean Patent Application No. 10-2010-0078550, filed on Aug. 14, 2010 in the KIPO (Korean Intellectual Property Office), the disclosure of which is incorporated herein entirely by reference. Further, this application is the National Stage application of International Application No. PCT/KR2011/005984, filed Aug. 13, 2011, which designates the United States and was published in Korean. Each of these applications is hereby incorporated by reference in their entirety into the present application.

TECHNICAL FIELD

The present invention relates to a battery technology, and more particularly, to electrode assembly having fiber-shaped structures, and battery including the same.

BACKGROUND ART

As a semiconductor manufacturing technology and a communication technology have recently been developed, the mobile electronic device industry has expanded, and demands for environmental preservation and development of alternative energy due to resource depletion have increased, battery related technologies have been actively studied. Since lithium primary batteries which are representative batteries have a higher voltage and higher energy density than conventional aqueous batteries, the lithium primary batteries may be easily made compact and light. Such lithium primary batteries are widely used, for example, as main power supply sources of mobile electronic devices or backup power supply sources.

Secondary batteries are rechargeable batteries formed of an electrode material having high reversibility. The secondary batteries are classified into cylindrical secondary batteries and polygonal secondary batteries according to outer appearances, and classified into nickel/metal hydride (Ni-MH) secondary batteries, lithium (Li) secondary batteries, and lithium-ion (Li-ion) secondary batteries according to cathode and anode materials. Devices to which secondary batteries are applied have been diversified from small batteries such as mobile phones, notebooks, and mobile displays to medium and large batteries for electric vehicles and hybrid vehicles. Accordingly, batteries are required to have high stability and cost effectiveness as well as lightweight design, high energy density, high charge/discharge speed, high charge/discharge efficiency, and excellent cycle characteristics.

DISCLOSURE OF THE INVENTION

Technical Problem

The present invention provides an electrode assembly of a battery which has high energy density, high charge/discharge efficiency, and excellent cycle characteristics and whose shape and capacity may be easily adjusted.

The present invention provides a battery using the electrode assembly having the above advantages.

Technical Solution

According to an aspect of the present invention, there is provided an electrode assembly including: a first electrode comprising at least one first structure, the at least one first structure having a fiber shape and any one of positive and negative polarities; and a second electrode comprising at least one second structure, the at least one second structure having a fiber shape and a polarity different from the polarity of the first structure, and spirally surrounds the first structure.

At least one of the first and second structures may include a current collector core and an active material layer that surrounds the current collector core. The current collector core for a cathode structure from among the first and second structures may include aluminum (Al) or an Al alloy. The current collector core for an anode structure from among the first and second structures may include copper (Cu) or a Cu alloy.

The active material layer may include an active material layer for a primary or secondary battery. A thickness of the active material layer for a cathode structure from among the first and second structures may range from 1 μm to 300 μm, and a thickness of the active material layer for an anode structure from among the first and second structures may range from 3 μm to 100 μm.

The electrode assembly may further include an electrolyte coating layer that is disposed on at least one of the first and second structures. The electrolyte coating layer may include a solid electrolyte layer. The electrode assembly may further include a separator that is disposed between the first and second structures. The separator may be coated on at least one of the first and second structures.

A plurality of the electrode assemblies may be provided as a plurality of segments having predetermined lengths in a battery case. The segments may have a spiral structure.

The segments may be randomly arranged to form a space in which an electrolyte is filled. The segments may extend by being twisted to have a thick wire structure. The electrode assembly may further include other segments that spirally surround the thick wire structure.

The segments may be woven to cross each other as weft threads and warp threads. The electrode assembly may further include a separator that is disposed between the segments, wherein the segments are woven so that the segments reciprocate through the separator and cross each other as weft threads and warp threads.

The segments may extend in parallel to form at least one virtual plane. The segments may extend to form a plurality of the virtual planes, and the electrode assembly may further include a separator that is disposed between the plurality of virtual planes. The segments may pass through an isolation matrix.

According to another aspect of the present invention, there is provided a battery including: the electrode assemblies of claim 1 which are arranged by being stacked, bent, or wound; and a case that surrounds the electrode assemblies. The battery may be a primary battery or a secondary battery.

Advantageous Effects

According to the embodiments of the present invention, since electrodes having opposite polarities include fiber-shaped structures and the fiber-shaped structures spirally extend, an interfacial surface area between the electrodes may increase due to curved surfaces of the structures and three-dimensional (3D) arrangements of the structures. Accordingly, energy density in the same volume may be improved, and charge/discharge speed, charge/discharge efficiency, and battery cycle characteristics may also be improved.

Also, since segments of the structures are arranged regularly or irregularly to form an appropriate space, an electrolyte impregnation process may be facilitated and a shape may be easily changed. Accordingly, batteries having various sizes, shapes, and capacities may be easily provided.

MODE FOR CARRYING OUT THE INVENTION

The present invention will now be described more fully with reference to the accompanying drawings, in which exemplary embodiments of the invention are shown.

The present invention now will be described more fully hereinafter with reference to the accompanying drawings, in which elements of the invention are shown. The present invention may, however, be embodied in many different forms and should not be construed as limited to the exemplary embodiments set forth herein. Rather, these embodiments are provided so that this disclosure will be thorough and complete, and will fully convey the scope of the present invention to one of ordinary skill in the art.

Also, in the drawings, thicknesses or sizes of layers are exaggerated for convenience of explanation and clarity, and the same reference numerals denote the same elements. As used herein, the term "and/or" includes any and all combinations of one or more of the associated listed items.

The terminology used herein is for the purpose of describing particular embodiments only and is not intended to be limiting of exemplary embodiments of the present invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of exemplary embodiments.

The embodiments of the present invention provide an electrode assembly including an electrode including a plurality of fiber-shaped structures which may increase an interfacial surface area between electrodes as compared to a conventional two-dimensional (2D) battery structure in which a plate-type cathode and a plate-type anode face each other.

When the expression 'different directions' are used herein, it means that when an electrode assembly including one or more first structures having fiber shapes and one or more second structures having fiber shapes forms an electrode structure, any one of the first and second structures extend in a direction other than the same direction as a direction in which the other structures extend. That is, different electrode assemblies have structural flexibility enough to be arranged in various angles and directions, Also, when the expression 'crossed structure' is used herein, it means that when segments of different electrode assemblies are stacked or wound to form an electrode structure, the segments meet at least one point to define an intersection point.

Also, when the term 'separator' is used herein, the separator includes a separator that is generally commonly used in a liquid electrolyte battery using a liquid electrolyte having affinity with the separator. Furthermore, when the separator used herein includes an intrinsic solid polymer electrolyte and/or a gel solid polymer electrolyte which is so strongly bound to the separator that the electrolyte and the separator are recognized as the same. Accordingly, the meaning of the separator has to be defined as described herein.

Figure 1A:
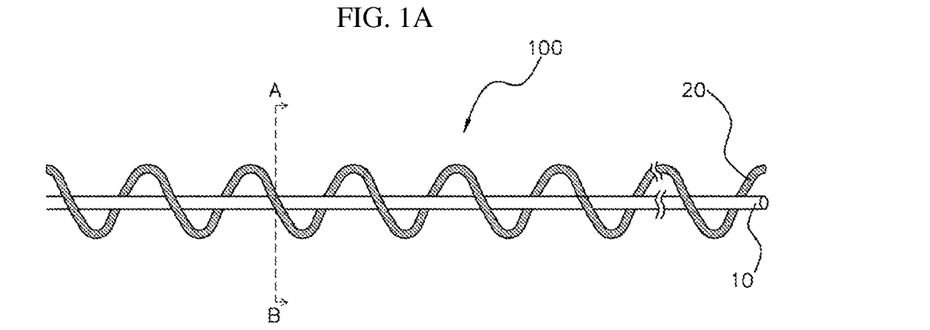
FIG. 1A is a view illustrating an electrode assembly of a battery, according to an embodiment of the present invention
Figure 1B:
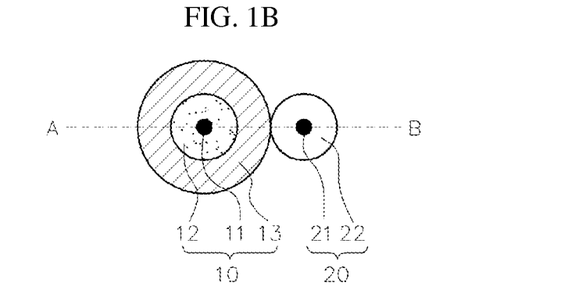
FIGS. 1B and 1C are cross-sectional views taken along line A-B of FIG. 1A, illustrating spiral structures according to various embodiments of the present invention.
Figure 1C:
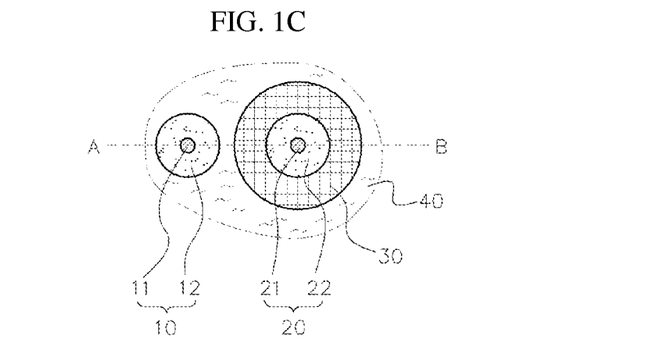

FIG. 1A is a view illustrating an electrode assembly 100 of a battery, according to an embodiment of the present invention. FIGS. 1B and 1C are cross-sectional views taken along line A-B of FIG. 1A, illustrating spiral structures according to various embodiments of the present invention.

Referring to FIG. 1A, the electrode assembly 100 includes a first electrode including a first structure 10 that has a fiber shape and any one of positive and negative polarities; and a second electrode including a second structure 20 that has a fiber shape and a polarity different from the polarity of the first structure 10 and spirally surrounds the first structure 10. Although one first structure 10 and one second structure 20 are exemplarily shown, a plurality of the first and second structures 10 and 20 may be provided. In this case, a plurality of the second structure 20 may spirally surround a plurality of the first structure 10. Alternatively, any one of the first and second electrodes may include a single structure and the other may include a plurality of structures.

The first and second structures 10 and 20 may be provided as segments having lengths ranging from several nanometers (nm) to tens of meters (m). One end portion of each of the first and second structures 10 and 20 may be connected to an electrode tab to provide an external electrode having a positive or negative polarity with respect to an external circuit and the other end portion may be connected to another electrode tab to provide an external electrode having a different polarity.

Each of the first and second structures 10 and 20 may have a thickness that may provide forming processibility suitable for various arrangement or patterns. For example, respective thickness of the first and second structures 10 and 20 may range from 400 μm to 2000 μm, and may be appropriately designed based on a technical field to which the battery is applied.

Referring to FIG. 1B, the first and second structures 10 and 20 may include current collector cores 11 and 21 and active material layers 12 and 22 that surround the current collector cores 11 and 12, respectively. Also, while the current collector cores 11 and 21 have circular cross-sectional shapes in FIG. 1B, the present embodiment is not limited thereto and the current collector cores 11 and 21 may have oval or rectangular cross-sectional shapes. Also, in order to provide surfaces which may be easily attached to the active material layers 12 and 22, the current collector cores 11 and 21 may have predetermined surface roughness, or conductive adhesive layers may be formed on the current collector cores 11 and 21.

The current collector cores 12 and 22 may be, for example, soft metal lines. For a structure for an anode from among the first and second structures 10 and 20, a metal-based material such as stainless steel, titan, aluminum, or an alloy thereof may be used as a current collector core. Preferably, the current collector core of the structure for an anode is aluminum or an alloy thereof. For a structure for an anode, a metal-based material such as copper, stainless steel, nickel, or an alloy thereof may be used as a current collector core. Preferably, the current collector core of the structure for the anode is copper or an alloy thereof.

However, the present embodiment is not limited to the above materials, and each of the current collector cores 12 and 22 may include another conductive material whose shape may be easily changed, for example, a polymer material having electronic conductivity such as poly(sulfurnitrile), polypyrrole, poly(p-phenylene), poly(phyenylene sulfide), polyaniline, or poly(p-phenylenevinylene). Alternatively, each of the current collector cores 12 and 22 may be formed of a fiber-shaped material obtained by mixing a conductive carbon paste, a nano metal particle paste, or an indium tin oxide (ITO) paste with an appropriate binder.

The active material layers 12 and 22 that respectively surround the current collector cores 11 and 21 may include a material layer suitable for a primary battery or a secondary battery. For example, in case that the battery is a primary battery, an active material layer for an anode may include manganese oxide, electrolytic manganese dioxide (EMD), nickel oxide, lead oxide, lead dioxide, silver oxide, iron sulfate, or conductive polymer particles. An active material layer for an anode may include zinc, aluminum, iron, lead, or magnesium particles.

In case that the battery is a secondary battery, the active material layer for the cathode may include an Li compound including at least one metal of Ni, Co, Mn, Al, Cr, Fe, Mg, Sr, V, La, and Ce, and at least one nonmetal element selected from the group consisting of O, F, S, P, or a combination thereof. The active material of the anode may include a carbon-based material such as a low-crystallized carbon or high-crystallized carbon-based material which may intercalate and deintercalate lithium ions. The low-crystallized carbon may be soft carbon or hard carbon. The high-crystallized carbon may be high temperature baked carbon such as natural graphite, Kish graphite, pyrolytic carbon, mesophase pitch-based carbon fiber, meso-carbon microbeads, mesophase pitches, or petroleum or coal tar pitch-derived cokes. The active material of the cathode may include a binder. The binder may be a polymer material such as vinylidene fluoride-hexfluoropropylene copolymer (PVDF-co-HFP), polyvinylidenefluoride, polyacrylonitrile, or polymethylmethacrylate. Alternatively, in order to provide a high-capacity secondary battery, the cathode active material layer 113b may include a metal-based or intermetallic compound including S, Si, or Sn.

The active material layers 12 and 22 may be respectively coated on the current collector cores 11 and 21 as slurries each including a corresponding active material, a binder, and a conductive material. The slurries may include the corresponding active material in an amount of 80 to 98 wt %, the binder in an amount of 1 to 10 wt %, and the conductive material in an amount of 1 to 10 wt %, based on 100 wt % in total.

Thicknesses of the active material layers 12 and 22 may be appropriately determined so that internal short-circuit may be reduced and a sufficiently thin design may be obtained. For example, a thickness of the active material layer for the cathode may range from 1 μm to 300 μm, and preferably, from 30 μm to 100 μm. Also, a thickness of the active material layer for the anode may range from 3 μm to 100 μm, preferably, from 3 μm to 40 μm, and more preferably, from 5 μm to 20 μm. Since thicknesses of the active material layers 12 and 22 are determined in the above range, the battery may ensure high power output and may be made very thin.

An electrolyte coating layer 13 may be further formed on at least one of the first structure 10 and the second structure 20. Although the electrolyte coating layer 13 is formed only on the first structure 10 in FIG. 1B, the present embodiment is not limited thereto and the electrolyte coating layer 13 may be formed only on the second structure 20 or on both the first and second structures 10 and 20.

As shown in FIG. 1B, when the electrolyte coating layer 13 is formed only on one structure having one polarity, since a volume may be reduced compared to a case where the electrolyte coating layer 13 is formed on both structures having positive and negative polarities, energy density may be improved. Also, when the first and second structures 10 and 20 having opposite polarities get closer to each other, cracks may occur in the electrolyte coating layer 13 due to a change in a volume of the electrode assembly 100 during electrical charging/discharging processes, thereby reducing lifetimes of the first and second structures 10 and 20. Accordingly, it is preferable that the electrolyte coating layer 13 is formed only on one structure having one polarity, and it is more preferable that the electrolyte coating layer 13 is formed only on a structure having a polarity whose volume change is smaller during electrical charging/discharging processes. For example, when the battery is a secondary battery, the electrolyte coating layer 13 may be selectively formed only on the first structure 10 having a negative polarity whose volume change is smaller during charging/discharging as shown in FIG. 1B.

The electrolyte coating layer 13 may be a solid electrolyte layer. The solid electrolyte layer may include, for example, a polymer matrix composed of any one of polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polyethylacrylate, polymethylmethacrylate, polyethylmethacrylate, polybutylacrylate, polybutylmethacrylate, polyvinyl acetate, polyvinyl alcohol, and a combination thereof, an additive, and an electrolytic solution.

The additive may be silica, talc, alumina (Al2O3), TiO2, clay, zeolite, or a combination thereof. The electrolytic solution may be an aqueous electrolytic solution including salt such as potassium hydroxide (KOH), potassium bromide (KBr), potassium chloride (KCL), zinc chloride (ZnCl2), or sulfuric acid (H2SO4). The electrolyte coating layer 13 may be formed by using a continuous impregnation process of the aforesaid materials using the same solvent as that used to form an active material layer disposed under the electrolyte coating layer 13.

The electrode assembly 100 may further include a separator 30 that is disposed between the first and second structures 10 and 20 in order to ensure electrical insulation between the first and second structures 10 and 20 which are adjacent to each other. For example, as shown in FIG. 1C, the separator 30 may be coated on the second structure 20. However, the present embodiment is not limited thereto, and the separator 30 may be formed only on the first structure 10, or on both the first and second structures 10 and 20. However, the present embodiment is not limited thereto, and the separator 30 provided between the first and second structures 10 and 20 may have any arbitrary structure that may ensure electrical insulation between the first and second structures 10 and 20 having fiber shapes. For example, the separator 30 may be have a layered structure (see FIG. 5A) or a bulky matrix structure (see FIG. 5B) as will be described below. Alternatively, although not shown, the first and second structures 10 and 20 having fiber shapes may pass through the separator 30 having the layered structure or the matrix structure and extend to spirally surround each other.

The separator 30 may be, for example, a micro-porous film, a woven fabric, a nonwoven fabric, an intrinsic sold polymer electrolyte film, or a gel polymer electrolyte film. The intrinsic solid polymer electrolyte film may include a straight chain polymer material or a cross-linked polymer material. The gel polymer electrolyte film may be any one of a plasticizer-containing polymer including salt, a filler-containing polymer, or a pure polymer, or a combination thereof.

The materials of the separator 30 are exemplary, and any appropriate electronic insulating material whose shape may be easily changed and which has high mechanical strength and may not be easily broken or cracked even the electrode assembly 100 is deformed may be used for the separator 30. The electronic insulating material may have appropriate ionic conductivity. The separator 30 may be a single-layered film or a multi-layered film. The multi-layered film may be a stack of single-layered films formed of the same material or a stack of single-layered films formed of different materials. Considering durability, shutdown function, and battery stability, a thickness of the separator 30 may range from 10 μm to 300 μm, preferably, from 10 μm to 40 μm, and more preferably, from 10 μm to 25 μm. In order to activate the first and second structures 10 and 20, an electrolytic solution 40 may surround the first and second structures 10 and 20.

As described above, since the first and second structures 10 and 20 continuously cross each other while spirally extending, an interfacial surface area between the first and second electrodes in the same volume may be increased. Accordingly, since the first and second electrodes are formed by using the first and second structures 10 and 20, energy density may be improved, and charge/discharge speed, charge/discharge efficiency, and battery cycle characteristics may also be improved.

Figure 2:
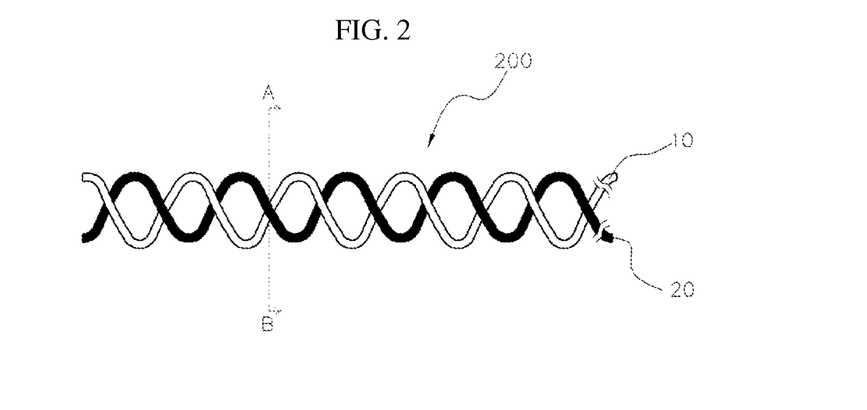
FIG. 2 is a view illustrating an electrode assembly of a battery, according to another embodiment of the present invention.

FIG. 2 is a view illustrating an electrode assembly 200 of a battery, according to an embodiment of the present invention.

Unlike the electrode assembly 100 of FIG. 1A, the electrode assembly 200 has a double spiral structure in which the first structure 10 and the second structure 20 spirally extend to surround each other. For elements disclosed in FIG. 2 which have the same designation number as those disclosed in FIGS. 1A through 1C, the above disclosure may be referred to unless being contradictory, and thus a repeated explanation will not be given.

Although a single first structure 10 and a single second structure 20 are shown in FIG. 2, the present embodiment is not limited thereto and a plurality of the first and second structures 10 and 20 may be provided. In this case, a plurality of the first structures 10 and a plurality of the second structures 20 may form a double spiral structure. Alternatively, one electrode may include a single structure, and the other electrode may include a plurality of structures. For example, one structure for an anode and a plurality of structures for a cathode may form a double spiral structure.

In FIG. 2, since the first and second structures 10 and 20 continuously face each other while spirally extending, an interfacial surface area may be further increased, thereby further strengthening coupling between electrodes. Accordingly, energy density may be further improved, and charge/discharge speed, charge/discharge efficiency, and battery cycle characteristics may also be improved. Also, since the double spiral structure increases the mechanical strength of the first and second structures 10 and 20 having fiber shapes and has a wire structure, the double spiral structure may be variously arranged in a battery case.

Figure 3A:
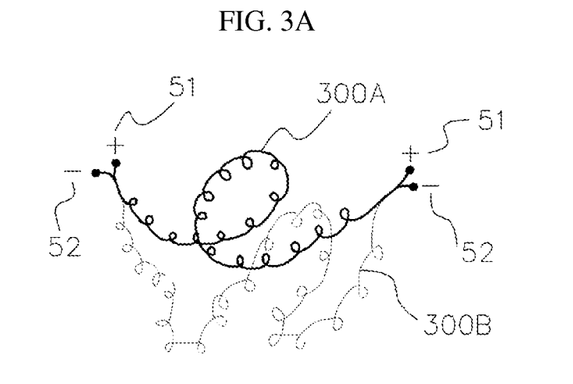
FIGS. 3A through 3C are views illustrating electrode assemblies arranged in a battery case, according to an embodiment of the present invention.
Figure 3B:
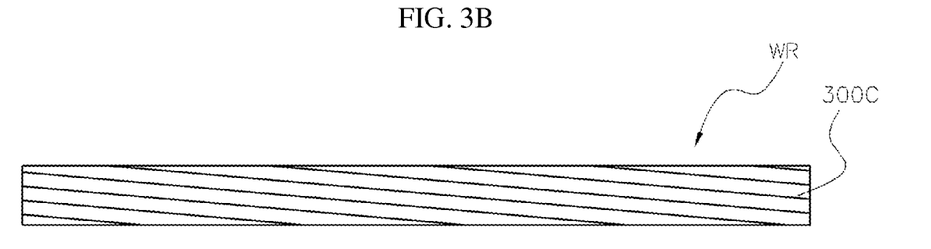
Figure 3C:
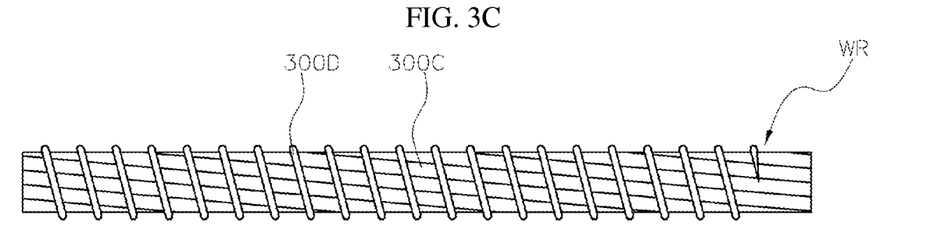

FIGS. 3A through 3C are views illustrating electrode assemblies arranged in a battery case, according to an embodiment of the present invention.

Referring to FIG. 3A, in order to provide a battery, the electrode assemblies may be arranged as a plurality of segments 300A and 300B having predetermined lengths in the battery case. Each of the segments 300A and 300B may have a spiral structure as shown in FIG. 3A. Since the electrode assemblies itself has a spiral structure, each of the segments 300A and 300B may be easily shaped to have a spiral structure. However, the present embodiment is not limited thereto, and each of the segments 300A and 300B may have a wave shape, a curly shape, or a Velcro shape to be tangled, instead of a spiral structure, like general threads. The segments 300A and 300B having various shapes may be irregularly arranged to be tangled with each other. A space formed between the tangled segments 300A and 300B may easily absorb an electrolytic solution like a sponge, thereby facilitating an impregnation process with the electrolytic solution.

One end portion of a cathode structure of the segment 300A and one end portion of a cathode structure of the segment 300B may be electrically connected to each other to provide a common cathode 51. Likewise, one end portion of an anode structure of the segment 300A and one end portion of an anode structure of the segment 300B may be electrically connected to each other to provide a common anode 52. The common cathode 51 and the common anode 52 may be provided as external electrodes. Alternatively, any one of cathodes and any one of anodes in the battery may be connected to each other, to provide any of various bipolar batteries in which operating voltages may increase.

Alternatively, the segments 300A and 300B of the electrode assemblies may be regularly arranged. FIG. 3B illustrates that segments 300C are regularly arranged to have a thick wire structure WR in which the segments 300C of two or more electrode assemblies extend by being twisted. The thick wire structure WR may increase the mechanical strength and the volume of the electrode assemblies, thereby enabling the battery to have a simple design and high durability. The thick wire WR may provide the battery having a linear shape, or may provide the battery having an arbitrary shape by being woven with another thick wire or being randomly arranged or arranged to have a Velcro shape. Alternatively, the thick wire WR may be surrounded by another segment 300D that spirally extends as shown in FIG. 3C. Although the segment 300D is obtained by combining a cathode structure having a fiber shape with an anode structure having a fiber shape in FIG. 3C, the thick wire WR may be obtained by winding at least one of a cathode structure having a fiber shape and an anode structure having a fiber shape.

Figure 4A:
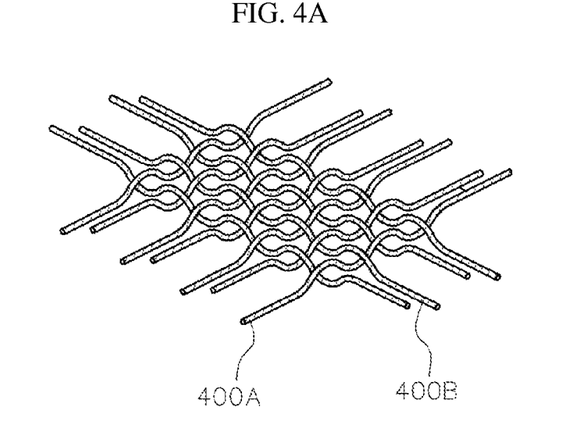
FIGS. 4A and 4B are perspective views illustrating segments of electrode assemblies which are regularly arranged, according to another embodiment of the present invention.
Figure 4B:
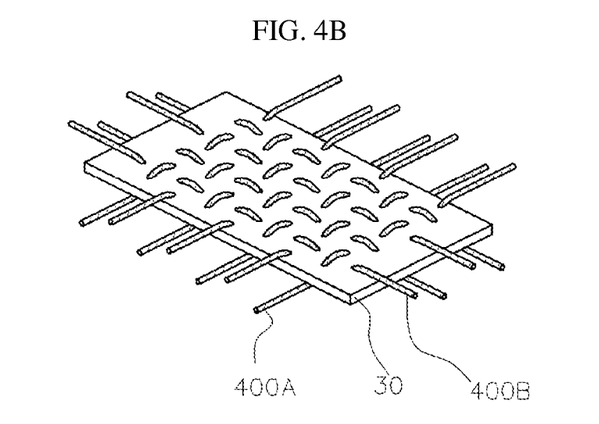

FIGS. 4A and 4B are perspective views illustrating segments 400A and 400B of electrode assemblies which are regularly arranged, according to another embodiment of the present invention.

Referring to FIG. 4A, the segments 400A and 400B of the electrode assemblies may be woven to cross each other as weft threads and warp threads. In this case, since the segments 400A and 400B have a planar shape and thus are easily deformed, for example, rolled, folded, or bent, a battery having any of various shapes may be provided. Also, as described with reference to FIG. 3A, an electrolytic solution may be easily penetrated into a space between the segments 400A and 400B.

Referring to FIG. 4B, the segments 400A and 400B of the electrode assemblies may be woven to reciprocate through the separator 30 and cross each other as weft threads and warp threads. Insulation between the segments 400A and 400B may be improved and the mechanical strength of the electrode assemblies may be improved due to the separator 30.

Figure 5A:
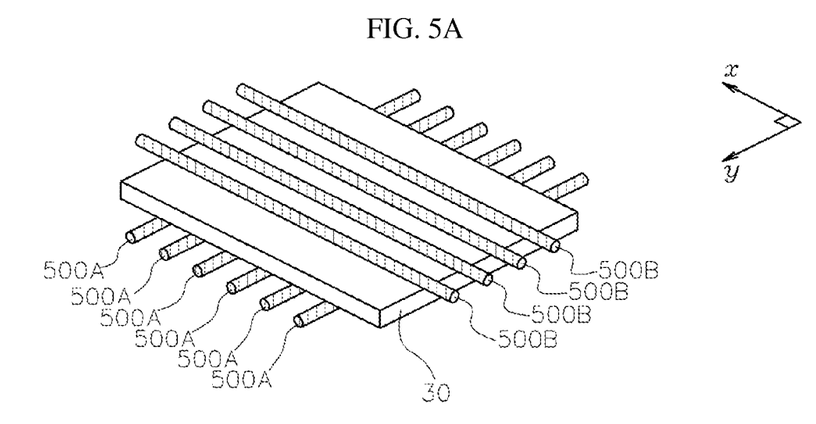
FIGS. 5A and 5B are perspective views illustrating segments of electrode assemblies which are regularly arranged, according to another embodiment of the present invention.
Figure 5B:
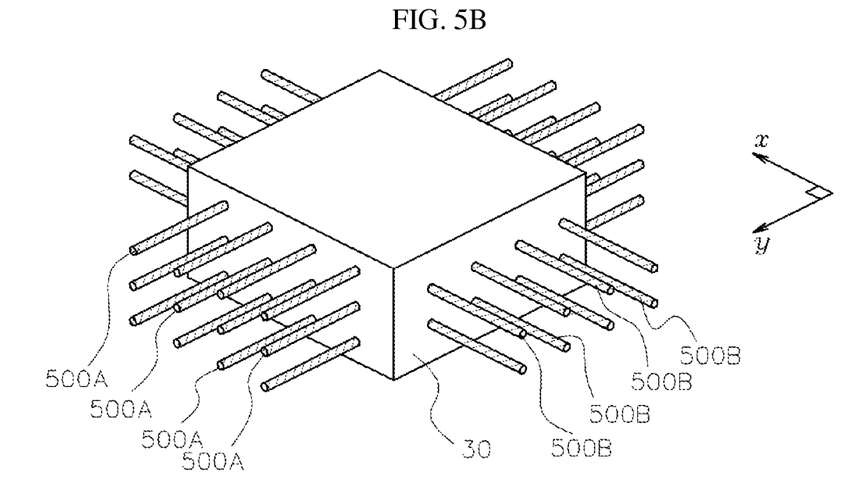

FIGS. 5A and 5B are perspective views illustrating segments 500A and 500B of electrode assemblies which are regularly arranged, according to another embodiment of the present invention.

Referring to FIG. 5A, the segments 500A and 500B of the electrode assemblies may extend in parallel in one direction in one virtual plane. The number of virtual planes in which the segments 500A and 500B extend in parallel may be two or more as shown in FIG. 5B, and the segments 500A and 500B in the virtual planes may extend in different directions. For example, as shown in FIG. 5A, the segments 500A in one virtual plane may cross the segments 500B in another plane at an angle of 90°. Each of a distance between the segments 500A and a distance between the segments 500B may be 0 or an arbitrary value from 5 µm to several thousands of µm as long as a battery has sufficient forming processibility. The separator 30 may be further disposed between planes including the segments 500A and 500B which extend in parallel.

Referring to FIG. 5B, virtual planes including the segments 500A and 500B which extend in parallel are contained in an isolation matrix 30. The isolation matrix 30 may be formed of the same material as that of the separator 30. The isolation matrix 30 may have a thickness great enough to have virtual planes of at least two segments 500A and 500B. In order to align the segments 500A and 500B in the isolation matrix 30, the isolation matrix 30 may be provided by aligning the segments 500A and 500B in a solution that is to be an isolation matrix and then coagulating the solution. It would be understood that the segments 500A and 500B which pass through the isolation matrix 30 do not need to be disposed on the same plane, and may be irregularly disposed. Also, as described above, fiber-shaped structures having opposite polarities of the segments 500A and 500B may extend by passing through the isolation matrix 30 and spirally surrounding each other.

Figure 6:
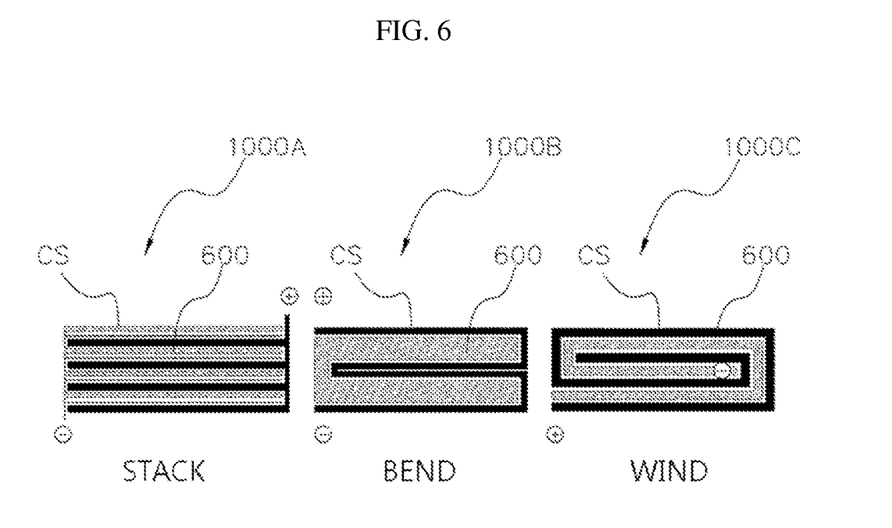
FIG. 6 is a cross-sectional view for explaining a process of arranging segments of electrode assemblies, according to an embodiment of the present invention.

Shapes of the electrode assemblies including the structures may be easily changed. The lengths, number, shapes, and electrical connection of the segments may be variously determined in order to adjust the capacity of the battery. FIG. 6 is a cross-sectional view for explaining a process of arranging segments of electrode assemblies, according to an embodiment of the present invention. Referring to FIG. 6, since shapes of fiber-shaped structures are easily changed, the segments may be deformed by being stacked, bent, or wound, to provide batteries 1000A, 1000B, and 1000C having various volumes and shapes. A cathode or an anode of an electrode assembly 600 in a case CS acts as an external cathode (+) or anode (−) of each battery. The batteries 1000A, 1000B, and 1000C may be used as small batteries by being attached to or integrated with clothes or bags, or may be used as large or medium batteries of vehicles by having high capacity.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A battery having a plurality of electrode assemblies, each assembly comprising:
    a first electrode comprising at least one first structure, the at least one first structure having a fiber shape and any one of positive and negative polarities;
    a second electrode comprising at least one second structure, the at least one second structure having a fiber shape and a polarity different from the polarity of the first structure, and spirally surrounds the first structure; and
    a separator disposed between the first and second structures,
    wherein the plurality of the electrode assemblies are provided as segments having predetermined lengths in a battery case,
    wherein the segments pass through an isolation matrix,
    wherein the separator and isolation matrix have ionic conductivity and comprise a micro-porous film, a woven fabric, a nonwoven fabric, an intrinsic solid polymer electrolyte, or a gel polymer electrolyte,
    wherein the segments have first segments and second segments,
    wherein the first segments have an array in which the first segments extend in parallel to form first virtual plane, and the second segments have an array in which the second segments extended parallel to form second virtual plane, and
    wherein the first virtual plane and the second virtual plane are spaced apart and the first segments and second segments cross over each other.

2. The battery of claim 1, wherein at least one of the first and second structures include a current collector core and an active material layer that surrounds the current collector core.

3. The battery of claim 2, wherein a current collector core for a cathode structure from among the first and second structures comprises aluminum (Al) or an Al alloy.

4. The battery of claim 2, wherein the current collector core for an anode structure from among the first and second structures comprises copper (Cu) or a Cu alloy.

5. The battery of claim 2, wherein the active material layer comprises an active material layer for a primary or secondary battery.

6. The battery of claim 2, wherein a thickness of the active material layer for a cathode structure from among the first and second structures ranges from 1 µm to 300 µm, and a thickness of the active material layer for an anode structure from among the first and second structures ranges from 3 µm to 100 µm.

7. The battery of claim 1, wherein the separator is coated on at least one of the first and second structures.

8. The battery of claim 1, wherein the first structure spirally extends to have a double spiral structure in which the first structure and the second structure surround each other.

9. The battery of claim 1, wherein the segments extend by being twisted to have a thick wire structure.

10. The battery of claim 9, further comprising other segments that spirally surround the thick wire structure.

* * * * *